June 30, 1942.  J. M. BAILEY  2,288,177
FLOOD LIGHT
Filed Nov. 3, 1938  2 Sheets-Sheet 1
Fig. 1.
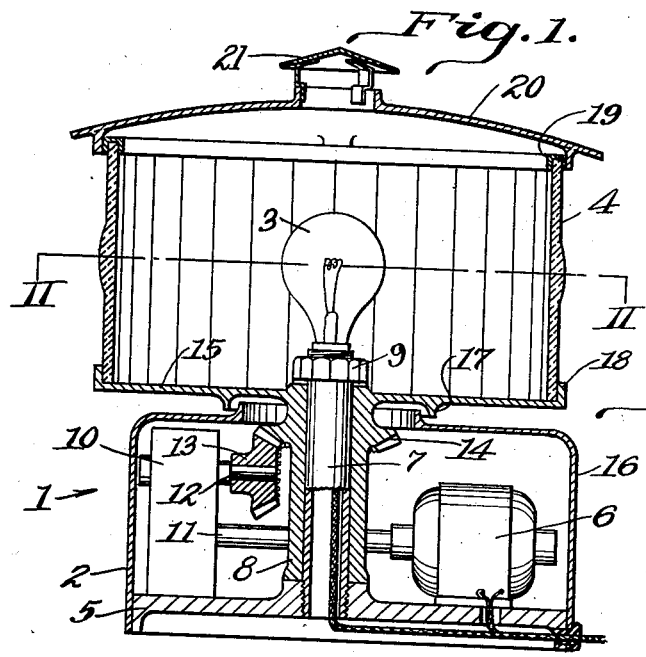
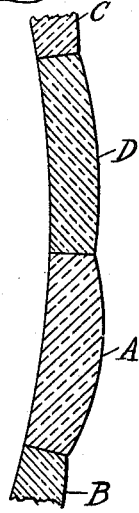
Fig. 3.
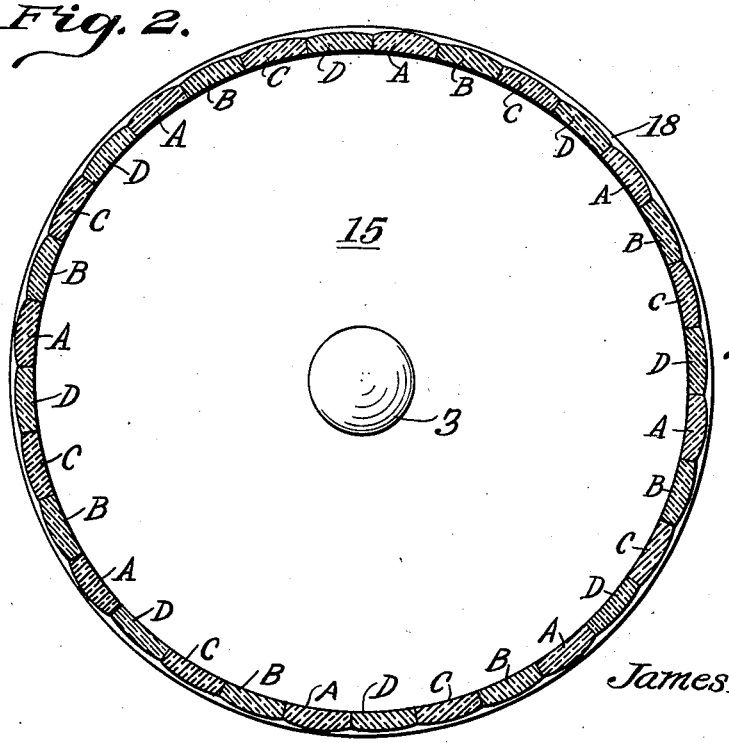
Fig. 2.
Fig. 4.
Inventor
James M. Bailey
By H. S. McDowell
Attorney

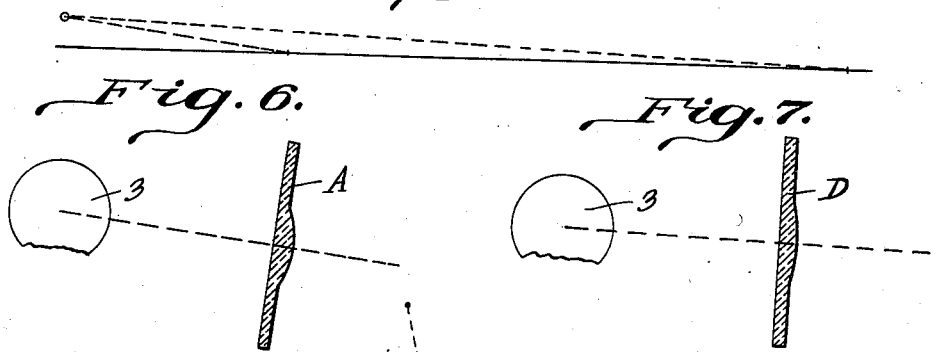
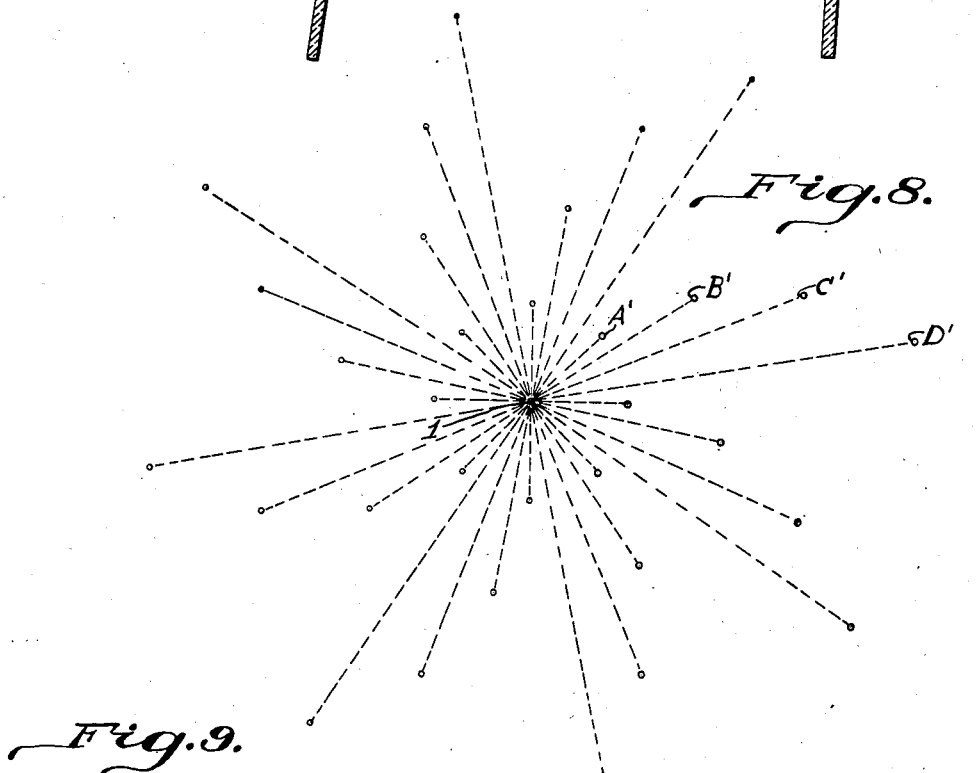
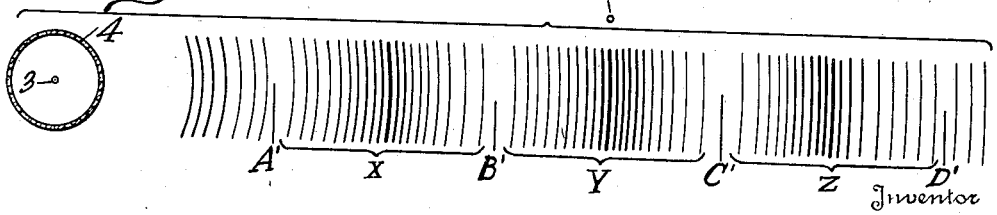

Patented June 30, 1942

2,288,177

UNITED STATES PATENT OFFICE 2,288,177

FLOODLIGHT

James M. Bailey, Columbus, Ohio

Application November 3, 1938, Serial No. 238,572

5 Claims. (Cl. 240—49)

This invention relates to illuminating devices and is particularly directed to floodlights. The primary object of the invention is to provide an improved floodlight which will illuminate a greater area than has been possible heretofore.

It is also an object of the invention to provide a light having a rotatable transparent and/or translucent globe in which are formed a plurality of lens elements having varying focal lengths. A number of similar lenses are employed in regularly spaced relation so that a plurality of rays will be focused on the same focal point during one revolution of the globe.

A further object resides in so disposing the lens elements of the globe that the focal points will be spaced at varying distances from the location of the floodlight.

Additional objects will be apparent from the following description and the accompanying drawings, in which:

Fig. 1 is a vertical sectional view taken through a lighting device formed in accordance with the present invention;

Fig. 2 is a horizontal sectional view taken through the lens cylinder of the illuminating device, the plane of the section being indicated by the line II—II of Fig. 1;

Fig. 3 is a detailed sectional view on an enlarged scale showing several of the lens elements;

Fig. 4 is a front elevation of a single lens element;

Figs. 5, 6 and 7 are diagrammatic views illustrating the different degrees to which the lens elements are tilted to position the focal points of the lenses at different distances from the center of the illuminating devices;

Fig. 8 is a diagrammatic view illustrating the distribution of the focal points or the brightly illuminated spots around the location of the device when the globe is stationary;

Fig. 9 is a diagrammatic view showing the distribution of the light when the globe is being rotated.

Referring more particularly to the drawings, the numeral 1 designates the floodlight in its entirety. In general, the floodlight includes a base 2, a light source 3 and a lens cylinder 4. The first of these elements comprises a cast or otherwise suitably formed body 5 on which is positioned an electric motor 6. At the approximate center of the body 5, there is secured a pedestal 7 around the axis of which is rotatably secured a sleeve 8. The upper end of the pedestal is provided with screw threads to receive a nut 9 used to prevent the displacement of the sleeve. A gear transmission device 10 is also carried by the body 5, the shaft of the motor 6 extending into the transmission as at 11. A second shaft 12 extends from the transmission and is provided at its outer end with a beveled gear 13 arranged to mesh with a corresponding gear 14 formed with the sleeve 8 adjacent its upper portion.

At the upper end, the sleeve 8 is formed with a circular plate 15 used in the support of the lens cylinder 4. The extreme upper end of the pedestal 7 receives and supports an electric lamp which comprises the light source 3. The conductors used to convey current to the lamp 3 pass through the hollow center of the column 7 and to a suitable source of supply. A housing 16 surrounds the mechanism on the body 5 and prevents dirt or other matter from entering the region around this mechanism. The under side of the member 15 is formed with a depending rib 17 to more effectively close the opening in the housing through which the sleeve and column project. An upstanding flange 18 is formed with the rim of the disk 15 and serves to assist in the support of the lenses which compose the lens cylinder. The upper ends of the lenses are secured in fixed relation by a circular channel member 19. The lenses may be secured together and to the disk and channel through the use of cement or other plastic material.

The open upper end of the lens cylinder is closed by means of a hood 20 in the center of which is formed an outlet for the escape of heat generated by the lamp 3. The entrance of rain or other foreign material into the opening in the hood is prevented by a cap 21 removably secured to the hood 20.

As illustrated in Figs. 2 and 3, the lens elements are of the converging type and a plurality of groups of lenses make up the lens cylinder. The number of lenses in the groups may be varied according to the desires of the manufacturer and each group includes lenses having different focal lengths. The corresponding lenses of each group are identical. In Fig. 2, similar lenses are designated by similar letters.

As shown in Figs. 5, 6 and 7, the lenses are tilted with respect to the longitudinal axis of the lens cylinder to direct the rays passing therethrough toward the earth's surface around the location of the floodlight. This will distribute the focal points of the lenses over the area to be illuminated, providing substantially equally spaced brightly lighted points over the said area.

There will be a plurality of brightly lighted spots spaced radially and circumferentially about the illuminating device as indicated at A', B', C' and D' in Figs. 8 and 9. When the lens cylinder of the floodlight is rotated, these spots will describe concentric circles of light around the point where the light is located. The speed of the motor, the ratio of the gearing and the number of lenses of similar focal length should be such as to render the change from one lens to a similar lens practically imperceptible to the human eye at any given point.

The areas, designated by the letters X, Y and Z in Fig. 9, between the brightly illuminated circles will receive rays of light which are not concentrated but pass through the portions of the lenses adjacent to the centers thereof. While these areas will not be as brightly illuminated as the areas receiving the directly concentrated rays, they will be sufficiently lighted since rays passing through all the lenses will be directed thereon.

In instances where it is not desired to illuminate the area completely surrounding the floodlight, a shield may be arranged to block the light rays when arey are not desired. For example, this arrangement would be suitable at the intersection of streets. In the event the floodlight is to be used as an aerial beacon, it may be found unnecessary to tilt the lenses with relation to the axis of rotation of the cylinder.

It is not essential that the grouping of the lenses be exactly as that illustrated in the drawings nor that the lens carrying member be truly cylindrical since many other shapes and arrangements may be devised which will serve equally well. The above remarks are also applicable to the mechanism for rotating the lens cylinder since the form shown in the drawings is one example only.

From the foregoing, it will be apparent that a floodlight has been provided which will illuminate a much greater area than those heretofore manufactured and which will direct concentrated rays of light on a number of places disposed at various distances from the light source at one time.

What is claimed is:

1. In a floodlight, a light source, a light transmitting drum mounted for rotary movement around said light source, said drum being formed of groups of circumferentially disposed spherical lens elements, the lenses of each group having different principal focal lengths, said lenses being inclined with respect to the axis of rotation of said drum, the lenses with the shortest principal focal length being inclined to a greater degree than those with longer principal focal lengths.

2. In a floodlight, a light source, a light transmitting drum mounted for rotary movement around said light source, said drum having a plurality of groups of spherical lenses, the lenses of each group being of different focal lengths, all of said lenses being inclined with respect to the axis of rotation of said drum, the lenses of similar focal length being similarly inclined, said lenses producing concentric groups of brightly illuminated spots, and means for rotating said drum to cause said spots to move in concentric circular paths.

3. In a floodlight, a light source, a light transmitting drum mounted for rotary movement around said light source, said drum having a plurality of groups of spherical lenses, all of said lenses being inclined with respect to the axis of rotation of said drum, the lenses of each group being of different focal lengths and inclined to different degrees to focus the rays of light passing therethrough on spots spaced at various distances from said light source, and means for rotating said drum, the speed of rotation of said drum and the number of lenses of similar focal length being such as to cause a substantially continuous beam of light of uniform intensity to be focused on any given point within range of said floodlight during the operation thereof.

4. In a floodlight, a light source, a light transmitting drum mounted for rotary movement around said light source, a plurality of spherical lens elements arranged side by side around the circumference of said drum, adjacent lenses being of different focal lengths, all of said lens elements being inclined with respect to the axis of rotation of said drum, the degree of inclination of said lenses being inversely proportional to the focal length.

5. In a floodlight, a light source, a drum formed from a plurality of panels surrounding said light source in circular order, a spherical magnifying lens element carried by each panel, the lens elements on adjacent panels being of different focal lengths and inclined to different degrees with respect to the longitudinal axis of said drum, and means for revolving said panels around said light source.

JAMES M. BAILEY.